United States Patent
Tsao et al.

(10) Patent No.: US 9,809,098 B2
(45) Date of Patent: Nov. 7, 2017

(54) TWO-SPEED TRANSMISSION FOR ELECTRIC VEHICLE

(71) Applicant: INDUSTRIAL TECHNOLOGY RESEARCH INSTITUTE, Hsinchu (TW)

(72) Inventors: Chia Tsao, New Taipei (TW); Jui-Tang Tseng, Hsinchu (TW); Kun-Ju Xie, Changhua County (TW); Tsung-Han Wu, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 133 days.

(21) Appl. No.: 14/972,080

(22) Filed: Dec. 16, 2015

(65) Prior Publication Data

US 2017/0122413 A1 May 4, 2017

(30) Foreign Application Priority Data

Nov. 4, 2015 (TW) .............................. 104136306 A

(51) Int. Cl.
*F16H 3/44* (2006.01)
*B60K 1/00* (2006.01)
*F16H 3/66* (2006.01)

(52) U.S. Cl.
CPC .......... *B60K 1/00* (2013.01); *B60K 2001/001* (2013.01); *F16H 3/66* (2013.01);
(Continued)

(58) Field of Classification Search
None
See application file for complete search history.

(56) References Cited

U.S. PATENT DOCUMENTS

| 7,094,171 | B2 | 8/2006 | Inoue |
| 7,186,203 | B2 | 3/2007 | Tabata et al. |

(Continued)

FOREIGN PATENT DOCUMENTS

| CN | 102801245 A | 11/2012 |
| CN | 104500616 A | 4/2015 |

(Continued)

OTHER PUBLICATIONS

Taiwanese Office Action dated Jan. 18, 2017.
(Continued)

*Primary Examiner* — Edwin A Young
(74) *Attorney, Agent, or Firm* — Rabin & Berdo, P.C.

(57) ABSTRACT

A two-speed transmission for an electric vehicle including an electric motor, a first transmission mechanism and a second transmission mechanism is provided. The electric motor includes a rotor and a spindle. The rotor drives a first sun gear and a first planet gear of the first transmission mechanism to rotate with respect to the first ring gear to generate a first gear ratio. The rotor drives a second sun gear and a second planet gear of the second transmission mechanism to rotate with respect to the second ring gear to generate a second gear ratio different from the first gear ratio. When the first clutch connects with the spindle, the second clutch separates from the spindle, and a first torque is outputted to the spindle. When the second clutch connects with the spindle, the first clutch separates from the spindle, and a second torque is outputted to the spindle.

20 Claims, 4 Drawing Sheets

(52) U.S. Cl.
CPC ............... *F16H 2200/0034* (2013.01); *F16H 2200/2007* (2013.01); *F16H 2200/2035* (2013.01)

(56) References Cited

U.S. PATENT DOCUMENTS

| | | | |
|---|---|---|---|
| 7,217,216 | B2 | 5/2007 | Inoue |
| 7,429,228 | B2 | 9/2008 | Hiraiwa |
| 8,235,853 | B2 | 8/2012 | Lutoslawski |
| 8,517,882 | B2 | 8/2013 | Wenthen |
| 2007/0149335 | A1* | 6/2007 | Strauss ............... B60K 6/445 475/5 |
| 2010/0216584 | A1 | 8/2010 | Lutoslawski |
| 2010/0285914 | A1 | 11/2010 | Wenthen |
| 2013/0130857 | A1* | 5/2013 | Gassmann ............ B60K 1/00 475/150 |
| 2013/0203543 | A1* | 8/2013 | Sten .................... F16H 48/36 475/150 |
| 2015/0192192 | A1* | 7/2015 | Honda ................ B60K 6/365 475/10 |
| 2016/0221657 | A1 | 8/2016 | Tsuei |

FOREIGN PATENT DOCUMENTS

| | | |
|---|---|---|
| JP | 2000-017996 A | 1/2000 |
| JP | 2002-257159 A | 9/2002 |
| JP | 2003-065357 A | 3/2003 |
| TW | M338932 U | 8/2008 |
| TW | M418834 U | 12/2011 |
| TW | M440371 U | 11/2012 |
| TW | I398587 B | 6/2013 |
| TW | 201343467 A | 11/2013 |
| TW | M472137 U | 2/2014 |
| TW | I428247 B | 3/2014 |
| TW | M500074 U | 5/2015 |

OTHER PUBLICATIONS

Koos van Berkel et al., "Fast and smooth clutch engagement control for dual-clutch transmissions", Control Engineering Practice 22, pp. 57-68, 2014.

Tristan M. Ericson et al., "Planetary gear modal vibration experiments and correlation against lumped-parameter and finite element models", Journal of Sound and Vibration 332, pp. 2350-2375, 2013.

Rajesh Purohit et al., "Design and Finite Element Analysis of an Automotive Clutch Assembly", Procedia Materials Science 6, pp. 490-502, 2014.

Shrenik M. Patil et al., "Modal and Stress Analysis of Differential Gearbox Casing with Optimization", Int. Journal of Engineering Research and Applications ISSN : 2248-9622, vol. 3, Issue 6, pp. 188-193, Nov.-Dec. 2013.

A.R. Crowther et al., "Torsional finite elements and nonlinear numerical modelling in vehicle powertrain dynamics", Journal of Sound and Vibration 284, pp. 825-849, 2005.

Vera Nikolic et al., "Dynamic Model for the Stress and Strain State Analysis of a Spur Gear Transmission", Strojniski vestnik—Journal of Mechanical Engineering 58(2012)1, pp. 56-67 DOI: 10.5545/sv-jme.2009.128, 2012.

\* cited by examiner

TWO-SPEED TRANSMISSION FOR ELECTRIC VEHICLE

This application claims the benefit of Taiwan application Serial No. 104136306, filed Nov. 4, 2015, the disclosure of which is incorporated by reference herein in its entirety.

TECHNICAL FIELD

The disclosure relates in general to a transmission, and more particularly to a two-speed transmission for an electric vehicle integrating two clutches.

BACKGROUND

As electric vehicles are getting more and more popular, the performance of a transmission is getting more and more important. Most of existing electric vehicles adopt one-speed transmission with a constant gear ratio of 6.4:1~7.5:1. Under such circumstance, when the vehicle is driving up the slope, the one-speed transmission cannot provide a higher torque; and when the vehicle is driving on a flat road, the one-speed transmission cannot provide a higher speed due to the restriction of the transmission gear ratio.

Since the existing one-speed transmission cannot be effectively used, many problems will arise. For example, the climbing capability is poor, the start-up is energy consuming, and the efficiency is low. When the vehicle is driving down the slope and the speed is accelerated, the electric motor may be dragged, and to the worse, may even be burnt down.

SUMMARY

The disclosure is directed to a two-speed transmission for an electric vehicle capable of providing two gear ratios applicable to different requirements of the vehicle, that is, a higher torque and a higher speed. The two-speed transmission for an electric vehicle has the features of higher energy utilization rate and better climbing capability.

According to one embodiment, a two-speed transmission for an electric vehicle including an electric motor, a first transmission mechanism and a second transmission mechanism is provided. The electric motor includes a rotor and a spindle. The first transmission mechanism is furnished on the spindle and includes a first ring gear, a first planet bracket, a first planet gear, a first sun gear and a first clutch. The first planet gear is furnished on the first planet bracket and meshed between the first ring gear and the first sun gear. The rotor drives the first sun gear and the first planet gear to rotate with respect to the first ring gear to generate a first gear ratio. The second transmission mechanism is furnished on the spindle and includes a second ring gear, a second planet bracket, a second planet gear, a second sun gear and a second clutch. The second planet gear is furnished on the second planet bracket and meshed between the second ring gear and the second sun gear. The rotor drives the second sun gear and the second planet gear to rotate with respect to the second ring gear to generate a second gear ratio, which is different from the first gear ratio. When the first clutch is activated to connect with the spindle, the second clutch separates from the spindle, and the electric motor outputs a first torque corresponding to the first gear ratio to the spindle. When the second clutch is activated to connect with the spindle, the first clutch separates from the spindle, and the electric motor outputs a second torque corresponding to the second gear ratio to the spindle.

The above and other aspects of the disclosure will become better understood with regard to the following detailed description of the preferred but non-limiting embodiment(s). The following description is made with reference to the accompanying drawings.

Figure 1:
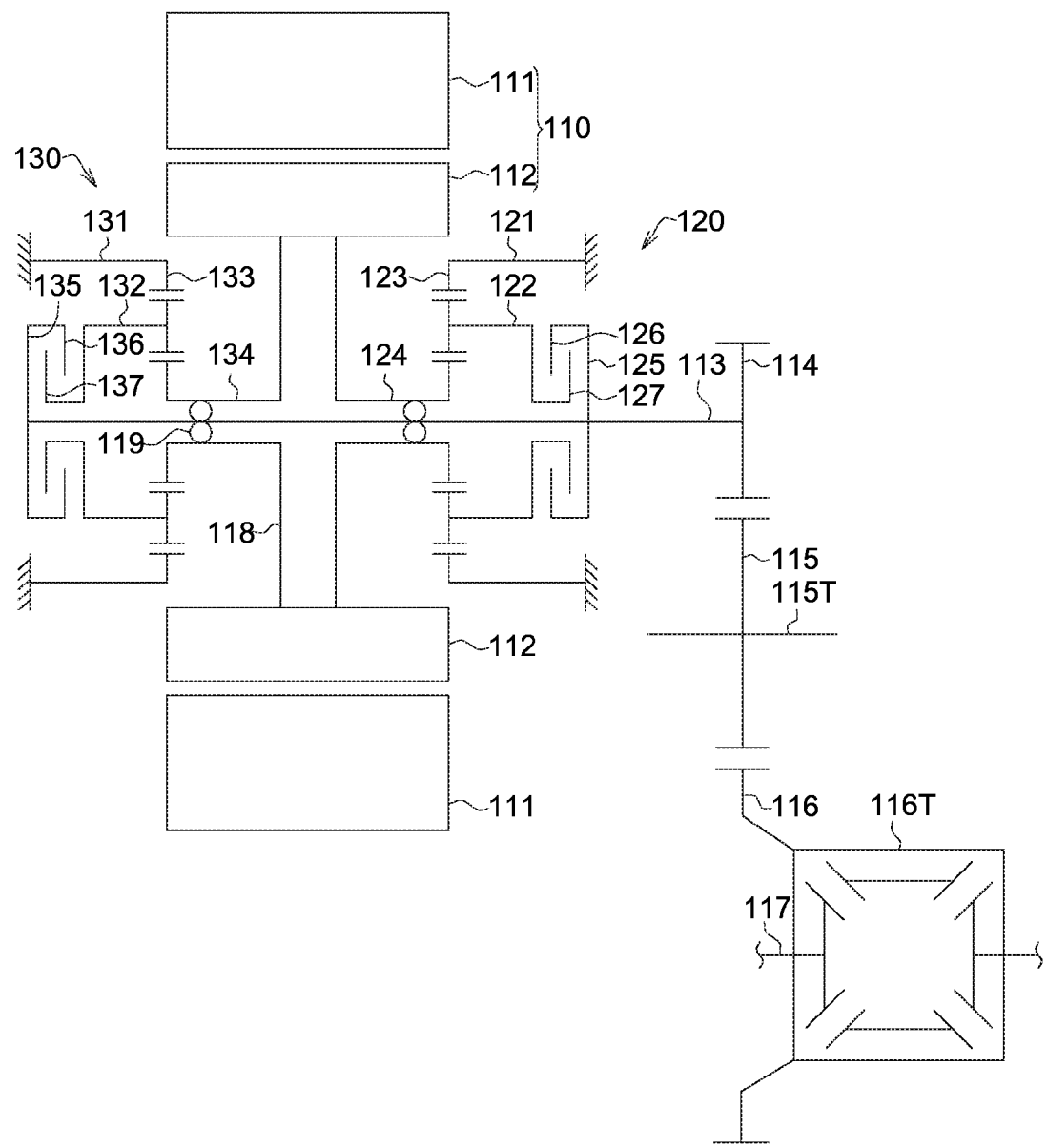
FIG. 1 is a schematic diagram of a two-speed transmission for an electric vehicle according to an embodiment of the disclosure.

In the following detailed description, for purposes of explanation, numerous specific details are assembly forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In an embodiment of the disclosure, two planet gear assemblies and two clutches are used to provide different gear ratios to meet different requirements of having a higher torque when the vehicle is driving up the slope and achieving a higher rotation speed when the vehicle is driving on a flat road, such that the climbing capability can be improved and the energy utilization rate can be increased.

In an embodiment, two assemblies of planet gears with different gear ratios are installed on two sides of the spindle of the electric motor, a first sun gear and a second sun gear are fixed at two ends of the rotor of the electric motor, a first ring gear and a second ring gear are installed on two sides of the rotor of the electric motor and fixed on the housing of the transmission. When the first clutch connects with the spindle, the second clutch separates from the spindle. Meanwhile, the electric motor drives the first assembly of the sun gear, the planet gear and the planet bracket to rotate and output a first torque corresponding to the gear ratio of the first assembly of the sun gear and the planet gear to the spindle. Then, the spindle gear is meshed with the differential gear through a countershaft gear to transfer the first torque to the transmission shaft of the vehicle.

Besides, when the first clutch separates from the spindle, the second clutch connects with the spindle. Meanwhile, the electric motor drives the second assembly of the sun gear, the planet gear and the planet bracket to rotate and outputs a second torque corresponding to the gear ratio of the second assembly of the sun gear and the planet gear to the spindle. Then, the spindle gear is meshed with the differential gear through the countershaft gear to transfer the second torque to the transmission shaft of the vehicle.

The first torque is a low torque corresponding to the planet gear assembly with a low gear ratio, under which the vehicle can achieve a higher rotation speed but a low torque. The low gear ratio is applicable the vehicle driving on a flat road. The second torque is a high torque corresponding to the planet gear assembly with a high gear ratio, under which the vehicle can achieve a higher torque but a lower rotation speed. The high gear ratio is applicable to the vehicle starting up or driving up or down the slope.

A number of embodiments are disclosed below for elaborating the disclosure. However, the embodiments of the disclosure are for detailed descriptions only, not for limiting the scope of protection of the disclosure.

Figure 2:
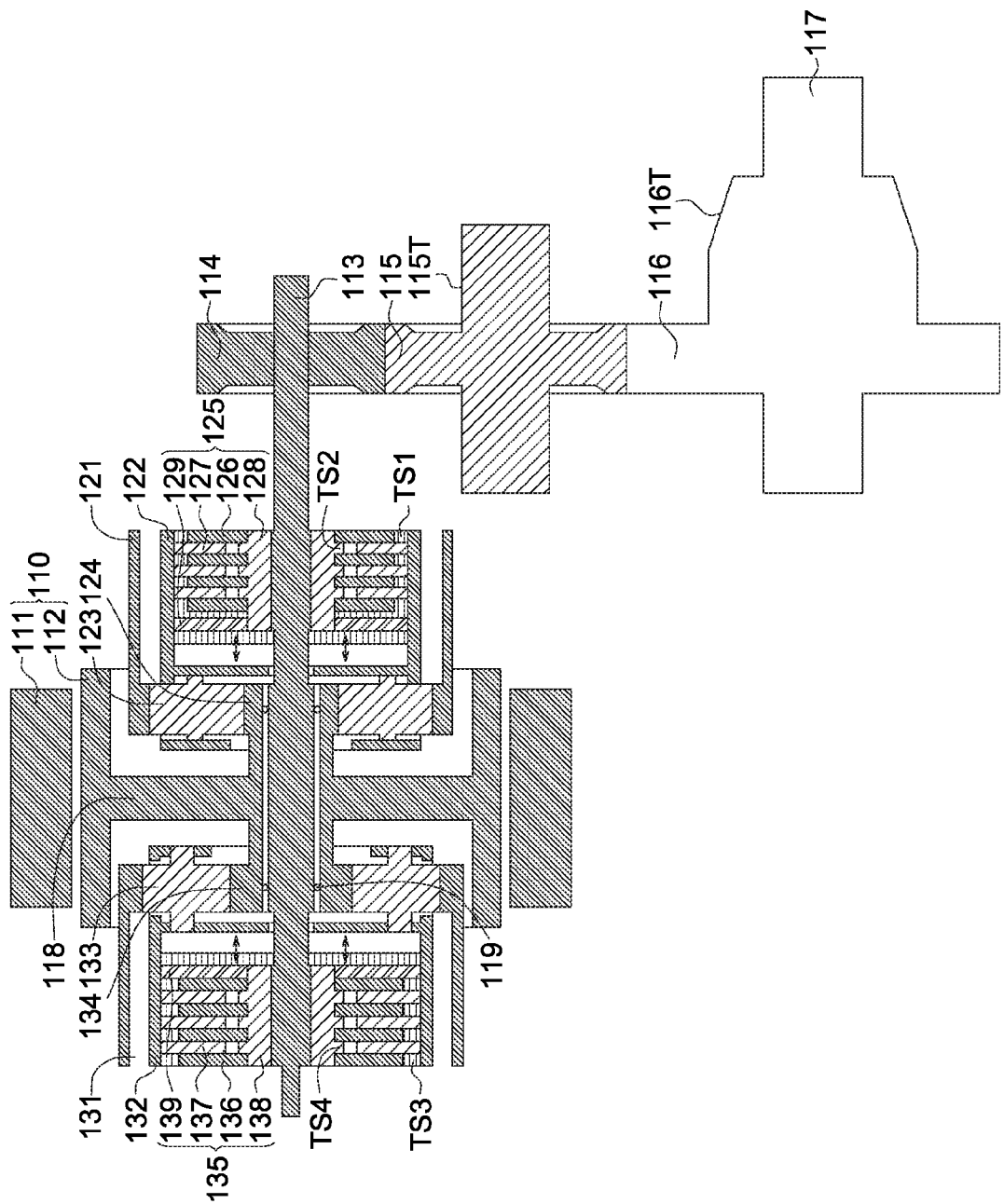
FIG. 2 and FIG. 3 respectively are a schematic diagram of an internal structure and a 3D diagram of a cross-section of a two-speed transmission for an electric vehicle according to an embodiment of the disclosure.
Figure 3:
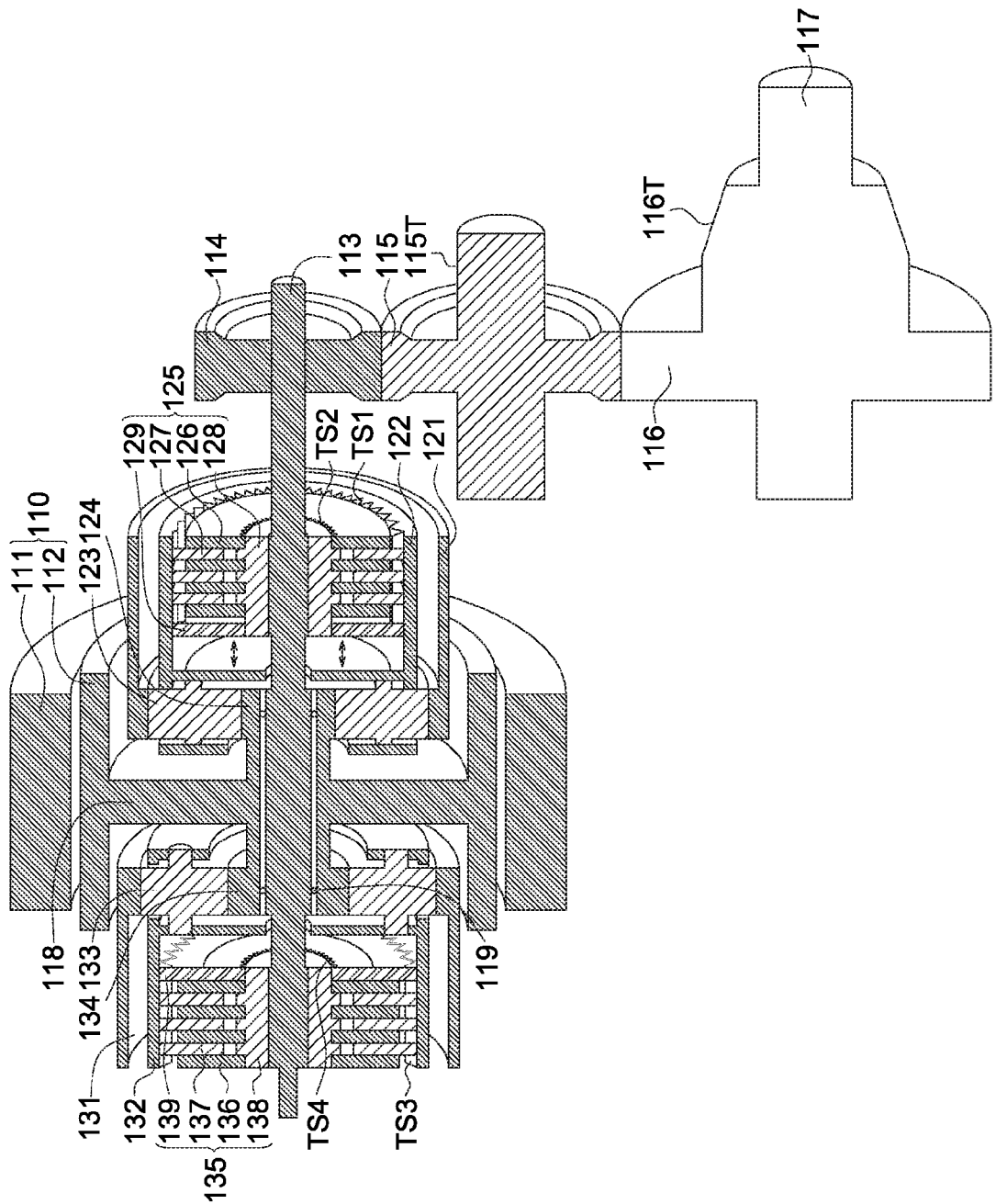
Figure 4:
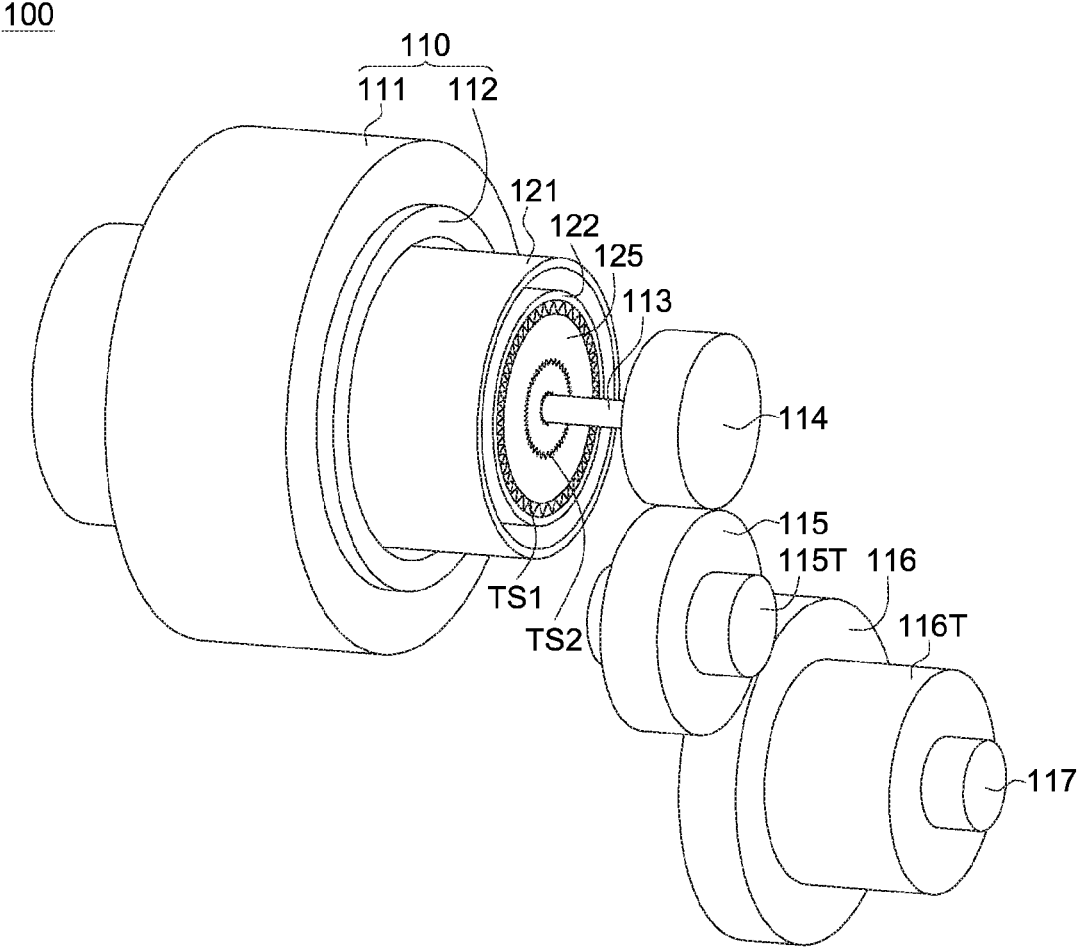
FIG. 4 is an appearance diagram of a two-speed transmission for an electric vehicle according to an embodiment of the disclosure.

Refer to FIG. 1 to FIG. 4. FIG. 1 is a schematic diagram of a two-speed transmission for an electric vehicle 100 according to an embodiment of the disclosure. FIG. 2 and FIG. 3 respectively are a schematic diagram of an internal structure and a 3D diagram of a cross-section of a two-speed transmission for an electric vehicle 100 according to an embodiment of the disclosure. FIG. 4 is an appearance diagram of a two-speed transmission for an electric vehicle 100 according to an embodiment of the disclosure.

As indicated in FIGS. 1 and 2, the two-speed transmission for an electric vehicle 100 includes an electric motor 110, a first transmission mechanism 120 and a second transmission mechanism 130. The electric motor 110 includes a stator 111, a rotor 112 and a spindle 113. The stator 111 is fixed on the housing of the electric motor. The spoke 118 of the rotor 112 is located on the radial direction of the rotor 112 and perpendicular to the axial direction of the spindle 113. The spoke 118 of the rotor 112 are furnished on the spindle 113 through a bearing 119 and rotate around the axis of the spindle 113. The spindle 113 can transfer the power of the electric motor 110 to a transmission structure, such as a differential gear 116, a differential 116T and a transmission shaft 117. In an embodiment, the electronic control unit (ECU), detecting vehicle speed and road conditions by using an external sensor, can switch the two-speed transmission for an electric vehicle 100 between a first speed mode and a second speed mode, and accordingly adjust the gear ratio of the transmission, such that the power outputted by the electric motor 110 can meet the requirement of providing a higher torque or achieving a higher rotation speed.

The first transmission mechanism 120 and the second transmission mechanism 130 are furnished on the spindle 113 of the electric motor 110 and respectively located on the left side and the right side of the rotor 112 of the electric motor 110. The first transmission mechanism 120 converts the power outputted from the electric motor 110 into a first torque, and further outputs the first torque to the spindle 113. Then, the spindle gear 114 furnished on the spindle 113 is meshed with the differential gear 116 through a countershaft gear 115 furnished on the countershaft 115T. The differential gear 116 drives the differential 116T to rotate and outputs the first torque to the transmission shaft of the vehicle 117. In another embodiment, the spindle gear 114 and the differential gear 116 can be driven by a belt or other transmission parts to output the first torque.

Furthermore, the second transmission mechanism 130 converts the power outputted from the electric motor 110 into a second torque, and further outputs the second torque to the spindle 113. Then, the spindle gear 114 furnished on the spindle 113 is meshed with the countershaft gear 115 located on the differential gear 116 through the countershaft 115T. The differential gear 116 drives the differential 116T to rotate and outputs the second torque to the transmission shaft of the vehicle 117. In another embodiment, the spindle gear 114 and the differential gear 116 can be driven by a belt or other transmission parts to output the second torque.

As indicated in FIGS. 1 and 2, the first transmission mechanism 120 includes a first ring gear 121, a first planet bracket 122, a first planet gear 123, a first sun gear 124 and a first clutch 125. The first ring gear 121 is fixed on the housing of the electric motor. The first planet gear 123 is furnished on the first planet bracket 122 and meshed between the first ring gear 121 and the first sun gear 124. The first sun gear 124 is fixed on one side of the spoke 118. The rotor 112 drives the first sun gear 124 and the first planet gear 123 to rotate with respect to the first ring gear 121, which accordingly drives the first planet bracket 122 to rotate.

The second transmission mechanism 130 includes a second ring gear 131, a second planet bracket 132, a second planet gear 133, a second sun gear 134 and a second clutch 135. The second ring gear 131 is fixed on an electrode housing. The second planet gear 133 is furnished on the second planet bracket 132 and meshed between the second ring gear 131 and the second sun gear 134. The second sun gear 134 is fixed on the other side of the spoke 118. The rotor 112 drives the second sun gear 134 and the second planet gear 133 to rotate with respect to the second ring gear 131, which accordingly drives the second planet bracket 132 to rotate.

In the present disclosure disclosed above, two transmission structures with different gear ratios are integrated, and a clutch controller (not illustrated in the diagram) is used to switch the two transmission structures with different gear ratios and output different torques to the transmission shaft of the vehicle 117 to meet different requirements of the vehicle. For example, the first gear ratio provides a higher rotation speed and the second gear ratio provides a higher torque, or the other way round. The disclosure does not have specific restriction regarding which gear ratio provides a higher rotation speed and which gear ratio provides a higher torque.

Refer to FIGS. 1 and 2. The first clutch 125 and the second clutch 135 can form an assembly of friction-plate clutches. The first clutch 125 includes a plurality of first static friction strips 126 furnished on the clutch centering bushing 128 and a plurality of first dynamic friction strips 127 staggered with the first static friction strips 126. The second clutch 135 includes a plurality of second static friction strips 136 furnished on the clutch centering bushing 138 and a plurality of second dynamic friction strips 137 staggered with the second static friction strips 136.

The first dynamic friction strips 127 are furnished on the inner wall of the first planet bracket 122. The first dynamic friction strips 127 and the inner wall of the first planet bracket 122 are connected through an outer spline TS1 extended in an axial direction such that the first dynamic friction strips 127 can move on the outer spline TS1 in the axial direction. As the first planet bracket 122 rotates, the first dynamic friction strips 127 synchronically rotates around the spindle 113. The first static friction strips 126 and the clutch centering bushing 128 are connected through an inner spline TS2 extended in an axial direction, such that the first static friction strips 126 can move on the inner spline TS2 in the axial direction. The clutch centering bushing 128 has a first pressure disc 129 furnished thereon. The first pressure disc 129 can be driven by the clutch controller to move on the spindle 113 in the axial direction (indicated by an arrow sign). When the first pressure disc 129 furnished on the clutch centering bushing 128 is activated to tightly press the first static friction strips 126, the first static friction strips 126 and the first dynamic friction strips 127 are connected. Since the first static friction strips 126 are furnished on the clutch centering bushing 128 which is further connected with the spindle 113, after the first pressure disc 129 is tightly pressed, the first torque outputted from the electric motor 110 (the rotor 112) can be transferred to the spindle 113 through the first clutch 125, which is in a connecting state. Conversely, after the first pressure disc 129 is released, since the first static friction strips 126 and the first dynamic friction strips 127 are not connected with each other, the first torque outputted from the electric motor 110 will not be transferred to the spindle 113. In the present embodiment, the rightmost first static friction strip 126 is fixed on the clutch centering bushing 128 by a C-shaped ring (not illustrated) and will not move on the inner spline TS2 in the axial direction.

Moreover, the second dynamic friction strips 137 are furnished on the inner wall of the second planet bracket 132. The second dynamic friction strips 137 and the inner wall of the second planet bracket 132 are connected through an outer spline TS3 extended in an axial direction, such that the second dynamic friction strips 137 can move on the outer spline TS3 in the axial direction. As the second planet bracket 132 rotates, the second dynamic friction strips 137 synchronically rotates around the spindle 113. The second static friction strips 136 and the clutch centering bushing 138 are connected through an inner spline TS4 extended in an axial direction, such that the second static friction strips 136 can move on the inner spline TS4 in the axial direction. The clutch centering bushing 138 has a second pressure disc 139 furnished thereon. The second pressure disc 139 can be driven by the clutch controller to move on the spindle 113 in the axial direction (indicated by an arrow sign). When the second pressure disc 139 furnished on the clutch centering bushing 138 is activated to tightly press the second static friction strips 136, the second static friction strips 136 and the second dynamic friction strips 137 are connected. Since the second static friction strips 136 are furnished on the clutch centering bushing 138 which is further connected with the spindle 113, after the second pressure disc 139 is tightly pressed, the second torque outputted from the electric motor 110 (the rotor 112) can be transferred to the spindle 113 through the second clutch 135, which is in a connecting state. Conversely, after the second pressure disc 139 is released, since the second static friction strips 136 and the second dynamic friction strips 137 are not connected with each other, the second torque outputted from the electric motor 110 will not be transferred to the spindle 113. In the present embodiment, the leftmost second static friction strip 136 is fixed on the clutch centering bushing 138 through by a C-shaped ring (not illustrated) and will not move on the inner spline TS4 in the axial direction. The first pressure disc 129 has a diameter equivalent to that of the first dynamic friction strips 127 and works with the outer spline TS2. Likewise, the second pressure disc 139 has a diameter equivalent to that of the second dynamic friction strips 137 and works with the outer spline TS4.

When the first clutch 125 and the second clutch 135 respectively separate from the spindle 113, the rotor 112 of the electric motor 110 is idled and cannot output the torque to the spindle 113, such that the electric motor 110 of the electric vehicle is in an idle state.

In an embodiment, the clutch controller controls the first clutch 125 to be meshed with or disengaged from the second clutch 135 through the actuation of a hydraulic component. That is, when the first static friction strips 126 and the first dynamic friction strips 127 of the first clutch 125 are pressed tightly and become connected, the second static friction strips 136 and the second dynamic friction strips 137 of the second clutch 135 are separated from each other. Conversely, when the first static friction strips 126 and the first dynamic friction strips 127 of the first clutch 125 are separated, the second static friction strips 136 and the second dynamic friction strips 137 of the second clutch 135 are pressed tightly and become connected. Since the shifting operation of the clutches 125 and 135 is easy and reliable, neutral gear, which may cause intermittent output of torque and make the vehicle jittering, will not occur during the process of shifting gears. Therefore, driving comfort can thus be greatly improved.

The two-speed transmission for an electric vehicle disclosed in above embodiments of the disclosure is capable of providing two gear ratios to meet the requirements of providing a higher torque and achieving a higher speed for different driving conditions. The two-speed transmission for an electric vehicle has the features of higher energy utilization rate and better climbing capability. Additionally, the transmission of the disclosure, having a compact and robust structure, which is light and small and easy to assemble, enhances the power of the electric vehicle and is beneficiary to the standardization and use of the electric vehicle.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A two-speed transmission for an electric vehicle, comprising:
   an electric motor, comprising a rotor and a spindle;
   a first transmission mechanism being furnished on the spindle further comprising a first ring gear, a first planet bracket, a first planet gear, a first sun gear and a first clutch, wherein the first planet gear is furnished on the first planet bracket and meshed between the first ring gear and the first sun gear, the rotor drives the first sun gear and the first planet gear to rotate with respect to the first ring gear to generate a first gear ratio; and
   a second transmission mechanism furnished on the spindle and comprising a second ring gear, a second planet bracket, a second planet gear, a second sun gear and a second clutch, wherein the second planet gear is furnished on the second planet bracket and meshed between the second ring gear and the second sun gear, and the rotor drives the second sun gear and the second planet gear to rotate with respect to the second ring gear to generate a second gear ratio, and the second gear ratio is different from the first gear ratio;
   wherein, when the first clutch is activated to connect with the spindle, the second clutch separates from the spindle, and the electric motor outputs a first torque corresponding to the first gear ratio to the spindle;
   when the second clutch is activated to connect with the spindle, the first clutch separates from the spindle, and the electric motor outputs a second torque corresponding to the second gear ratio to the spindle.

2. The two-speed transmission for an electric vehicle according to claim 1, wherein when the first clutch and the second clutch separate from the spindle respectively, the rotor is idled, and no torque is outputted to the spindle.

3. The two-speed transmission for an electric vehicle according to claim 1, wherein the spindle has a spindle gear furnished thereon, and the spindle gear is connected with a differential gear.

4. The two-speed transmission for an electric vehicle according to claim 3, further comprising a countershaft gear meshed between the spindle gear and the differential gear.

5. The two-speed transmission for an electric vehicle according to claim 1, wherein the rotor has a spoke located on a radial direction of the rotor and perpendicular to an axial direction of the spindle.

6. The two-speed transmission for an electric vehicle according to claim 5, wherein the spoke is furnished on the spindle through a bearing and rotates around the axial direction of the spindle.

7. The two-speed transmission for an electric vehicle according to claim 6, wherein the first sun gear and the second sun gear are fixed on two opposite sides of the spoke.

8. The two-speed transmission for an electric vehicle according to claim 1, wherein the first clutch comprises a plurality of first static friction strips furnished on a clutch centering bushing and a plurality of first dynamic friction strips staggered with the first static friction strips.

9. The two-speed transmission for an electric vehicle according to claim 8, wherein the first dynamic friction strips are furnished on an inner wall of the first planet bracket and synchronically rotate around the spindle as the first planet bracket rotates.

10. The two-speed transmission for an electric vehicle according to claim 9, wherein the first dynamic friction strips and the inner wall of the first planet bracket are connected through an outer spline extended in an axial direction of the spindle, such that the first dynamic friction strips are configured to move on the outer spline in the axial direction of the spindle.

11. The two-speed transmission for an electric vehicle according to claim 8, wherein the first static friction strips and the clutch centering bushing are connected through an inner spline extended in an axial direction of the spindle, such that the first static friction strips are configured to move on the inner spline in the axial direction of the spindle.

12. The two-speed transmission for an electric vehicle according to claim 8, wherein the clutch centering bushing has a first pressure disc furnished thereon, and when the first pressure disc is activated to move on the spindle in an axial direction of the spindle and tightly press the first static friction strips, the first static friction strips and the first dynamic friction strips are connected.

13. The two-speed transmission for an electric vehicle according to claim 12, wherein the first pressure disc is driven by a hydraulic component.

14. The two-speed transmission for an electric vehicle according to claim 1, wherein the second clutch comprises a plurality of second static friction strips furnished on a clutch centering bushing and a plurality of second dynamic friction strips staggered with the second static friction strips.

15. The two-speed transmission for an electric vehicle according to claim 14, wherein the second dynamic friction strips are furnished on an inner wall of the second planet bracket and synchronically rotate around the spindle as the second planet bracket rotates.

16. The two-speed transmission for an electric vehicle according to claim 15, wherein the second dynamic friction strips and the inner wall of the second planet bracket are connected through an outer spline extended in an axial direction of the spindle, such that the second dynamic friction strips are configured to move on the outer spline in the axial direction of the spindle.

17. The two-speed transmission for an electric vehicle according to claim 14, wherein the second static friction strips and the clutch centering bushing are connected through an inner spline extended in an axial direction of the spindle, such that the second static friction strips are configured to move on the inner spline in the axial direction of the spindle.

18. The two-speed transmission for an electric vehicle according to claim 14, wherein the clutch centering bushing has a second pressure disc furnished thereon, and when the second pressure disc is activated to move on the spindle in an axial direction of the spindle and tightly press the second static friction strips, the second static friction strips and the second dynamic friction strips are connected.

19. The two-speed transmission for an electric vehicle according to claim 18, wherein the second pressure disc is driven by a hydraulic component.

20. The two-speed transmission for an electric vehicle according to claim 1, wherein the first transmission mechanism and the second transmission mechanism are furnished on two sides of the rotor.

\* \* \* \* \*